United States Patent
Nguyen et al.

(10) Patent No.: US 10,668,647 B2
(45) Date of Patent: Jun. 2, 2020

(54) PREPREG WITH VARIABLE CURE RATE RESIN COMPOSITION

(71) Applicant: TORAY INDUSTRIES, INC., Tokyo (JP)

(72) Inventors: Felix N. Nguyen, Tacoma, WA (US); Alfred P. Haro, Tacoma, WA (US); Bradley R. Fenbert, Tacoma, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 107 days.

(21) Appl. No.: 15/762,175

(22) PCT Filed: Sep. 27, 2016

(86) PCT No.: PCT/IB2016/001504
§ 371 (c)(1),
(2) Date: Mar. 22, 2018

(87) PCT Pub. No.: WO2017/055920
PCT Pub. Date: Apr. 6, 2017

(65) Prior Publication Data
US 2018/0290339 A1    Oct. 11, 2018

Related U.S. Application Data

(60) Provisional application No. 62/233,717, filed on Sep. 28, 2015, provisional application No. 62/378,418, filed on Aug. 23, 2016.

(51) Int. Cl.
*B29B 11/16* (2006.01)
*C08J 5/24* (2006.01)
(Continued)

(52) U.S. Cl.
CPC ............. *B29B 11/16* (2013.01); *B32B 5/022* (2013.01); *B32B 5/024* (2013.01); *B32B 5/026* (2013.01);
(Continued)

(58) Field of Classification Search
CPC ......... C09J 7/00; C09J 7/02; C09J 7/20; C09J 2463/00; C09J 2463/006; C09J 2463/008;
(Continued)

(56) References Cited

U.S. PATENT DOCUMENTS 4,004,061 A * 1/1977 Creighton .................. C09J 7/10
428/349
6,894,113 B2   5/2005 Court et al.
(Continued)

FOREIGN PATENT DOCUMENTS

EP    1072634 A1    1/2001
EP    1632533 A1    3/2006
(Continued)

OTHER PUBLICATIONS

International Search Report and Written Opinion for International Application No. PCT/IB2016/001504, dated Feb. 7, 2017, 9 pages.
(Continued)

*Primary Examiner* — Camie S Thompson
(74) *Attorney, Agent, or Firm* — RatnerPrestia (57) ABSTRACT

A prepreg comprising a layer of impregnated reinforcing fibers comprising at least one layer of reinforcing fibers impregnated by a resin composition comprising at least a thermosetting resin, a curing agent and an accelerator, such that the accelerator has a gradient concentration which is more concentrated in the resin composition in the vicinity of the reinforcing fibers than further away. The resin composition comprising a first resin composition impregnates the reinforcing fibers to provide a layer of impregnated rein-
(Continued)

forcing fibers and a surface layer comprising a second resin composition is formed on the layer of impregnated reinforcing fibers, wherein the first resin composition has at least one peak exotherm occurring at a time earlier than and/or at a temperature lower than any peak exotherm of the second resin composition. The heat generation from the first resin composition is tailored to initiate or speed up the curing of the second resin composition, leading to a substantial reduction of cure cycle time of the prepreg. Excellent handling and processing abilities of the uncured prepreg and excellent physical, thermal and mechanical properties when cured are achieved.

22 Claims, 1 Drawing Sheet (51) Int. Cl.
| | |
|---|---|
| B32B 27/12 | (2006.01) |
| B32B 5/28 | (2006.01) |
| B32B 27/36 | (2006.01) |
| B32B 27/08 | (2006.01) |
| B32B 27/28 | (2006.01) |
| B32B 5/02 | (2006.01) |
| B32B 27/42 | (2006.01) |
| B32B 27/26 | (2006.01) |
| B32B 27/38 | (2006.01) |
| B32B 27/20 | (2006.01) |
| B32B 27/40 | (2006.01) |
| B32B 7/04 | (2019.01) |
| B32B 5/26 | (2006.01) |
| B32B 27/18 | (2006.01) |
| B32B 27/34 | (2006.01) |
| B32B 27/30 | (2006.01) |
| B29K 63/00 | (2006.01) |
| B29K 307/04 | (2006.01) |

(52) U.S. Cl.
CPC .................. *B32B 5/26* (2013.01); *B32B 5/28* (2013.01); *B32B 7/04* (2013.01); *B32B 27/08* (2013.01); *B32B 27/12* (2013.01); *B32B 27/18* (2013.01); *B32B 27/20* (2013.01); *B32B 27/26* (2013.01); *B32B 27/281* (2013.01); *B32B 27/285* (2013.01); *B32B 27/286* (2013.01); *B32B 27/288* (2013.01); *B32B 27/30* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *C08J 5/24* (2013.01); *B29K 2063/00* (2013.01); *B29K 2307/04* (2013.01); *B32B 2250/05* (2013.01); *B32B 2250/40* (2013.01); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2264/0207* (2013.01); *B32B 2264/0214* (2013.01); *B32B 2264/0264* (2013.01); *B32B 2264/102* (2013.01); *B32B 2264/107* (2013.01); *B32B 2264/108* (2013.01); *B32B 2270/00* (2013.01); *B32B 2307/30* (2013.01); *B32B 2307/306* (2013.01); *B32B 2307/50* (2013.01); *B32B 2307/54* (2013.01); *B32B 2307/558* (2013.01); *B32B 2307/714* (2013.01); *B32B 2307/718* (2013.01); *B32B 2307/732* (2013.01); *C08J 2363/00* (2013.01); *C08J 2463/00* (2013.01); *C08J 2471/00* (2013.01); *C08J 2479/04* (2013.01)

(58) Field of Classification Search
CPC ......... Y10T 428/2826; Y10T 428/2848; B29B 11/16; B29K 2060/00; B29K 2307/04; C08J 5/24; C08J 2363/00; C08J 2463/00; C08J 2471/00; C08J 5/02; C08J 5/124; C08G 59/49; B32B 2260/046; B32B 2305/72; B32B 37/12; B32B 37/14; B32B 37/144; B29C 65/4835; B29C 65/5057; B29C 66/721; B29C 66/73735
USPC .............. 156/283, 313, 315, 307.3; 427/202, 427/407.1, 207.1; 428/349, 354
See application file for complete search history.

(56) References Cited

U.S. PATENT DOCUMENTS

| | | |
|---|---|---|
| 7,820,760 B2 | 10/2010 | Pham et al. |
| 2009/0130379 A1 | 5/2009 | Kousaka et al. |
| 2010/0280151 A1 | 11/2010 | Nguyen et al. |
| 2013/0130584 A1 | 5/2013 | Fujiwara et al. |
| 2014/0057515 A1 | 2/2014 | Suzuki et al. |
| 2014/0309336 A1 | 10/2014 | Hughes et al. |
| 2014/0342144 A1 | 11/2014 | Nakayama et al. |
| 2016/0121591 A1 | 5/2016 | MacAdams et al. |

FOREIGN PATENT DOCUMENTS

| | | |
|---|---|---|
| EP | 2123711 A1 | 11/2009 |
| JP | 2007182494 A | 7/2007 |
| WO | 2010099029 A1 | 9/2010 |
| WO | 2013130378 A1 | 9/2013 |
| WO | 2014078095 A2 | 5/2014 |
| WO | 2015130368 A2 | 9/2015 |

OTHER PUBLICATIONS

International Preliminary Report on Patentability for International Application No. PCT/IB2016/001504, dated Apr. 3, 2018, 8 pages.

\* cited by examiner

PREPREG WITH VARIABLE CURE RATE RESIN COMPOSITION

CROSS-REFERENCE TO RELATED APPLICATIONS

This application is the U.S. National Phase application of PCT/162016/001504, filed Sep. 27, 2016, which claims priority to U.S. Provisional Application No. 62/233,717, filed 28 Sep. 2015, and to U.S. Provisional Application No. 62/378,418, filed 23 Aug. 2016. The entire disclosure of each of these applications is incorporated herein by reference in its entirety for all purposes.

TECHNICAL FIELD OF THE INVENTION

The present invention provides an innovative prepreg comprising a layer of impregnated reinforcing fibers comprising at least one layer of reinforcing fibers impregnated by a resin composition comprising at least a thermosetting resin, a curing agent and an accelerator, such that the accelerator has a gradient concentration which is more concentrated in the resin composition in the vicinity of the reinforcing fibers than further away. In one embodiment, the resin composition comprises a first resin composition impregnating the reinforcing fibers and a surface layer comprising a second resin composition is formed on the layer of impregnated reinforcing fibers. Furthermore, the first resin composition has at least one peak exotherm occurring at a time earlier than and/or at a temperature lower than any peak exotherm of the second resin composition and the amount of heat generated by the first resin composition during the exotherm is at least equal to the amount of heat generated by the second resin composition during the exotherm. The generated heat from the first resin composition may provide additional heat to cure the second resin composition when an external heating means is applied to the prepreg, leading to a reduction of its cure cycle time. The uncured prepreg has excellent handling and processing abilities as well as excellent thermal and mechanical properties when it is cured.

The prepreg may be molded in an autoclave or by an out-of-autoclave method where autoclave pressure is not available such as vacuum bag only and "Quickstep"; hydraulic press or pressure-press (a.k.a., press-clave, Rapidclave®), or any derivative molding methods with high heating rates such as induction heating, electromagnetic heating, or resistive heating, to achieve a void-free composite article in a shortest possible cure cycle time.

BACKGROUND OF THE INVENTION

Current composite technologies developed for aircraft only allow for a low volume, autoclave-cure process that is both time-intensive and costly. The autoclave is often used to mold a prepreg, which is defined as a sheet of plurality of reinforcing fibers impregnated by a resin composition on one side or both sides of the plurality of the reinforcing fibers. Such a prepreg offers mechanical performance advantages over other forms of the fiber reinforced resins. A long cure cycle time results from both slow heating (ramp) rate of the autoclave and a prepreg material that needs to be isothermally cured over a long period of time to obtain a high degree of cure (DoC) to achieve the required thermal and mechanical performance. High ramp rates in the autoclave sometimes are not desired due to exotherm (amount of heat generated during cure but ineffectively controlled), especially for a composite article with thick dimensions.

The resin composition may contain a thermosetting resin and a curing agent that chemically interact. However, the interactions could occur at ambient conditions leading to undesired effects on the handling and processing abilities of the prepreg such as tack, drape, storage time, and out time (at certain processing conditions). Several approaches have been patented to improve handling and processing abilities of a prepreg employing a surface layer with substantially lower reactivity (than the resin composition that is used to impregnate the reinforcing fibers) applied to one, or both side of the prepreg. For example, US20140057515A1 (Suzuki et al., Toho) disclosed a composition of a prepreg comprising reinforcing fibers impregnated by a primary epoxy resin composition and a surface layer comprising a secondary epoxy resin composition, such that only either of the primary resin composition or the secondary resin comprises a curing agent. EP1072634A1 (Steele, Hexcel) suggested to have either one of their resin compositions of a prepreg comprise a major amount of a curing agent.

In order to reduce the cure cycle time, traditional approaches are to introduce an accelerator, a catalyst or a highly reactive curing agent into the resin composition to speed up its reaction kinetics (see, for examples, US20140309336A1, Hughes et al., Toray Industries and WO2010099029A1, Bongiovanni, Cytec). However, the accelerator might even accelerate the reactions at ambient or other suitable processing conditions, complicating not only the resulting prepreg's handling and processing abilities when not cured but also its thermal and mechanical properties after being cured.

SUMMARY OF THE INVENTION

An embodiment of the invention relates to a prepreg comprising a layer of impregnated reinforcing fibers comprising at least one layer of reinforcing fibers impregnated by a resin composition comprising at least a thermosetting resin, a curing agent and an accelerator, such that the accelerator has a gradient concentration which is more concentrated in the resin composition in the vicinity of the reinforcing fibers than further away (i.e., the resin composition has a higher concentration of accelerator in a region proximate to the reinforcing fibers than in a region further away from the reinforcing fibers). The resin composition may comprise a first resin composition impregnating the reinforcing fibers and a surface layer comprising a second resin composition formed on the layer of impregnated reinforcing fibers, wherein the first resin composition has at least one peak exotherm occurring at a time earlier than and/or at a temperature lower than any peak exotherm of the second resin composition and the first resin composition generates an amount of heat during exotherm that is at least equal to the amount of heat generated by the second resin composition during exotherm, such that the generated heat from the first resin composition is configured to initiate or speed up reaction of the second resin composition, allowing the prepreg to be cured at a cure temperature in a reduced dwell time for a given desired degree of cure. The first resin composition comprises the thermosetting resin, the curing agent, and the accelerator, and optionally a thermoplastic resin, a filler or a combination thereof. There are several options for the second resin composition. In one embodiment, it may comprise at least a thermosetting resin and a curing agent. It may further comprise a thermoplastic resin, a filler, an accelerator or a combination thereof. In another embodiment, the second resin composition comprises at least a thermoplastic resin or at least a thermosetting resin and no curing agent, or a combination thereof. In yet another embodiment, the second resin composition comprises at least a thermosetting resin, no curing agent, and the accelerator that would have been included in the first resin composition in the aforementioned embodiments, such that either the accelerator, the curing agent, or both diffuse into the other resin composition and accelerate curing of the prepreg. Moreover, in another embodiment, the above prepregs might comprise an interlayer toughening material and/or a breather layer comprising a high-aspect-ratio material, wherein the interlayer toughening material and/or the high-aspect ratio material is localized on the surface of the layer of impregnated reinforcing fibers to which the surface layer is applied. Furthermore, in another embodiment, the above prepregs, when isothermally cured at 177° C. (350° F.) for at most 60 minutes, achieve a degree of cure of at least 93% and a glass transition temperature of at least 175° C.

Another embodiment of the invention relates to a prepreg comprising a layer of impregnated reinforcing fibers comprising at least one layer of reinforcing fibers impregnated by a resin composition comprising at least an epoxy resin, a diaminodiphenylsulfone, a dihydrazide, and an interlayer toughener, wherein the dihydrazide is tailored to have a gradient concentration which is more concentrated in the resin composition in the vicinity of the reinforcing fibers than further away, wherein the interlayer toughener is localized on the surface of the reinforcing fibers, and wherein the prepreg when cured at 177° C. (350° F.) for at most 60 minutes achieves a degree of cure of at least 93% and a glass transition temperature of at least 175° C. The choices for the components which may be present in the second resin composition are similar to those discussed above.

Other embodiments relate to a method of making the aforementioned prepregs and manufacturing a composite article comprising curing the aforementioned prepregs.

DETAILED DESCRIPTION OF THE INVENTION

Figure 1:
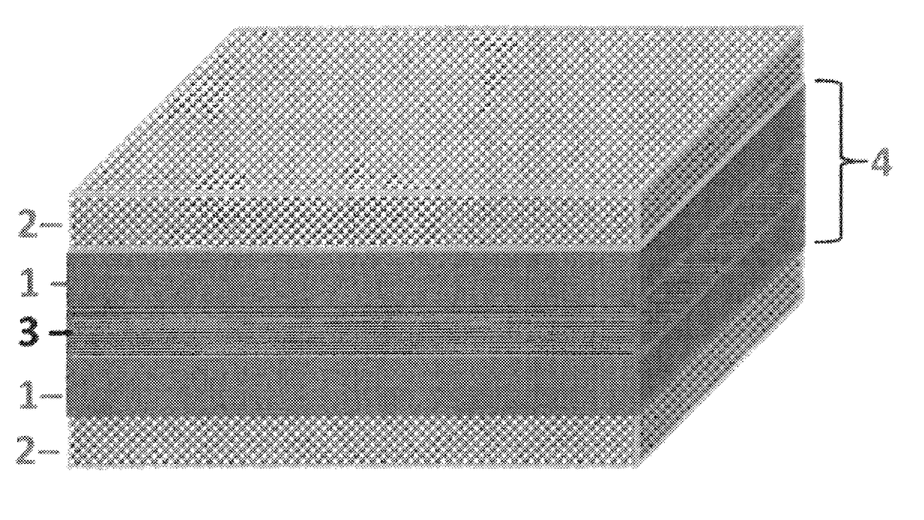
FIG. 1 is a schematic of a prepreg configuration according to the first embodiment of the present invention having a layer (4) of impregnated reinforcing fibers comprised of a layer of reinforcing fibers (3) impregnated by a first resin composition (1) and a surface layer (2) formed on the layer (4) of impregnated reinforcing fibers. The first resin composition could partially to fully impregnate the layer of reinforcing fibers (3). The surface layer could partially be dissolved into or otherwise be partially intermingled with the first resin composition and vice versa. A surface layer (2) may be present on both sides of layer (4), as illustrated in FIG. 1, or only on one side of layer (4). A ratio of the thickness of the first resin composition (1) to the thickness of the surface layer (2) might be engineered to allow optimal heat transfer from air to the first resin composition through the surface layer as well as heat generated from the first resin composition to the surface layer during cure of the prepreg. The ratio of thicknesses could be, for example, at most 1.0, at most 1.5, at most 3.0 or even at most 5.0.

According to an embodiment of the present invention, a prepreg comprises a layer of impregnated reinforcing fibers comprising at least one layer of reinforcing fibers impregnated by a resin composition comprising at least a thermosetting resin, a curing agent and an accelerator, such that the accelerator has a gradient concentration which is more concentrated in the resin composition in the vicinity of the reinforcing fibers than further away. The resin composition may comprise a first resin composition impregnating the reinforcing fibers to provide a layer of impregnated reinforcing fibers; a surface layer comprising a second resin composition may be formed on the layer of impregnated reinforcing fibers. The first resin composition may have at least one peak exotherm occurring at a time substantially earlier and/or at a temperature lower than any peak exotherm of the second resin composition and an amount of heat generated by the first resin composition may be at least equal to that generated by the second resin composition, such that the generated heat from the first resin composition is configured to initiate or speed up reaction of the second resin composition, allowing the prepreg to be cured at a cure temperature in a substantially reduced dwell time to achieve a desired degree of cure. The first resin composition may comprise the thermosetting resin, the curing agent and the accelerator.

In the above embodiments, there are no specific limitations or restrictions on the choice of a reinforcing fiber, as long as the effects of the invention are not deteriorated. Examples include carbon fibers, organic fibers such as aramid fibers, silicon carbide fibers, metal fibers (e.g., alumina fibers), boron fibers, tungsten carbide fibers, glass fibers (e.g., S glass, S-1 glass, S-2 glass, S-3 glass, E-glass, L-glass from AGY), and natural/bio fibers. Carbon fiber in particular may be used to provide the cured prepreg with exceptionally high strength and stiffness as well as light weight. Of all carbon fibers, those with a strength of 2000 MPa or higher, an elongation of 0.5% or higher, and a modulus of 200 GPa or higher are preferably used. Examples of carbon fibers are those from Toray Industries having a standard modulus of about 200-250 GPa (e.g., Torayca® T300, T300J, T400H, T600S, T700S, T700G), an intermediate modulus of about 250-300 GPa (e.g., Torayca® T800H, T800S, T1000G, M30S, M30G), or a high modulus of greater than 300 GPa (e.g., Torayca® M40, M35J, M40J, M46J, M50J, M55J, M60J).

The form and the arrangement of a layer of reinforcing fibers used are not specifically limited. Any of the forms and spatial arrangements of the reinforcing fibers known in the art such as long fibers in a direction, chopped fibers in random orientation, single tow, narrow tow, woven fabrics, mats, knitted fabrics, and braids may be employed. The term "long fiber" as used herein refers to a single fiber that is substantially continuous over 10 mm or longer or a fiber bundle comprising the single fibers. The term "short fibers" as used herein refers to a fiber bundle comprising fibers that are cut into lengths of shorter than 10 mm. Particularly in the end use applications for which high specific strength and high specific elastic modulus are desired, a form wherein a reinforcing fiber bundle is arranged in one direction may be most suitable. From the viewpoint of ease of handling, a cloth-like (woven fabric) form is also suitable for the present invention. The layer of impregnated reinforcing fibers may contain one, two, three or more layers of reinforcing fibers.

The thermosetting resin in the first resin composition may be defined herein as any resin which can be cured with a curing agent or a cross-linker compound by means of an externally supplied source of energy (e.g., heat, light, electromagnetic waves such as microwaves, UV, electron beam, or other suitable methods) to form a three dimensional crosslinked network having the required resin modulus. The thermosetting resin may be selected from, but is not limited to, epoxy resins, epoxy novolac resins, ester resins, vinyl ester resins, cyanate ester resins, maleimide resins, bismaleimide resins, bismaleimide-triazine resins, phenolic resins, novolac resins, resorcinolic resins, unsaturated polyester resins, diallylphthalate resins, urea resins, melamine resins, benzoxazine resins, polyurethanes, and mixtures thereof, as long as it does not deteriorate the effects of the invention.

From the viewpoint of an exceptional balance of strength, strain, modulus and environmental effect resistance, the use of epoxy resins may be advantageous, including mono-, di-functional, and higher functional (or multifunctional) epoxy resins and mixtures thereof. Multifunctional epoxy resins are preferably selected as they provide excellent glass transition temperature (Tg), modulus and even high adhesion to a reinforcing fiber. These epoxies are prepared from precursors such as amines (e.g., epoxy resins prepared using diamines and compounds containing at least one amine group and at least one hydroxyl group such as tetraglycidyl diaminodiphenyl methane, triglycidyl-p-aminophenol, triglycidyl-m-aminophenol, triglycidyl aminocresol and tetraglycidyl xylylenediamine and their isomers), phenols (e.g., bisphenol A epoxy resins, bisphenol F epoxy resins, bisphenol S epoxy resins, bisphenol R epoxy resins, phenol-novolac epoxy resins, cresol-novolac epoxy resins and resorcinol epoxy resins), naphthalene epoxy resins, dicyclopentadiene epoxy resins, epoxy resins having a biphenyl skeleton, tris(hydroxyphenol)methane based epoxies (Tactix® 742 by Huntsman Advanced Materials), tetraglycidyl ether of glyoxal phenol novolac, fluorene based epoxies, isocyanate-modified epoxy resins and compounds having a carbon-carbon double bond (e.g., alicyclic epoxy resins). It should be noted that the epoxy resins are not restricted to the examples above. Halogenated epoxy resins prepared by halogenating these epoxy resins may also be used. Furthermore, mixtures of two or more of these epoxy resins, and compounds having one epoxy group or monoepoxy compounds such as glycidylaniline, glycidyl toluidine or other glycidylamines (particularly glycidylaromatic amines) may be employed in the formulation of the thermosetting resin matrix.

Examples of commercially available bisphenol A epoxy resin products include jER® 825, jER® 828, jER® 834, jER® 1001, jER® 1002, jER® 1003, jER® 1003F, jER® 1004, jER® 1004AF, jER® 1005F, jER® 1006FS, jER® 1007, jER® 1009, jER® 1010 (which are manufactured by Mitsubishi Chemical Corporation), and EPON® 825 and EPON® 828 (from Momentive). Examples of commercially available brominated bisphenol A epoxy resin products include jER® 505, jER® 5050, jER® 5051, jER® 5054 and jER® 5057 (which are manufactured by Mitsubishi Chemical Corporation). Examples of commercially available hydrogenated bisphenol A epoxy resin products include ST5080, ST4000D, ST4100D and ST5100 (which are manufactured by Nippon Steel Chemical Co., Ltd.).

Examples of commercially available bisphenol F epoxy resin products include jER® 806, jER® 807, jER® 4002P, jER® 4004P, jER® 4007P, jER® 4009P and jER® 4010P (which are manufactured by Mitsubishi Chemical Corporation), and Epotohto® YDF2001, Epotohto® YDF2004 (which are manufactured by Nippon Steel Chemical Co., Ltd.), and Epiclon® 830 (from Dainippon Ink and Chemicals, Inc.). An example of a commercially available tetramethyl-bisphenol F epoxy resin product is YSLV-80XY (manufactured by Nippon Steel Chemical Co., Ltd.).

An example of a bisphenol S epoxy resin is Epiclon® EXA-154 (manufactured by DIC Corporation).

Examples of commercially available tetraglycidyl diaminodiphenyl methane resin products include Sumiepoxy® ELM434 (manufactured by Sumitomo Chemical Co., Ltd.), YH434L (manufactured by Nippon Steel Chemical Co., Ltd.), jER® 604 (manufactured by Mitsubishi Chemical Corporation), and Araldite® MY720, MY721, and MY722 (which are manufactured by Huntsman Advanced Materials). Examples of commercially available triglycidyl aminophenol or triglycidyl aminocresol resin products include Sumiepoxy® ELM100 (manufactured by Sumitomo Chemical Co., Ltd.), Araldite® MY0500, MY0510 and MY0600, MY0610 (which are manufactured by Huntsman Advanced Materials) and jER® 630 (manufactured by Mitsubishi Chemical Corporation). Examples of commercially available tetraglycidyl xylylenediamine products and hydrogenated products thereof include TETRAD-X and TETRAD-C (which are manufactured by Mitsubishi Gas Chemical Company, Inc.).

Examples of commercially available phenol-novolac epoxy resin products include jER® 152 and jER® 154 (which are manufactured by Mitsubishi Chemical Corporation), and Epiclon® N-740, N-770 and N-775 (which are manufactured by DIC Corporation).

Examples of commercially available cresol-novolac epoxy resin products include Epiclon® N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a commercially available resorcinol epoxy resin product is Denacol® EX-201 (manufactured by Nagase ChemteX Corporation).

Examples of commercially available naphthalene epoxy resin products include HP-4032, HP4032D, HP-4700, HP-4710, HP-4770, HP-5000, EXA-4701, EXA-4750, and EXA-7240 (which are manufactured by DIC Corporation) and MY0816 (which is manufactured by Huntsman Advanced Materials).

Examples of commercially available dicyclopentadiene epoxy resin products include Epiclon® HP7200, HP7200L, HP7200H and HP7200HH (which are manufactured by DIC Corporation), Tactix® 558 (manufactured by Huntsman Advanced Materials), and XD-1000-1L and XD-1000-2L (which are manufactured by Nippon Kayaku Co., Ltd.).

Examples of commercially available epoxy resin products having a biphenyl skeleton include jER® YX4000H, YX4000 and YL6616 (which are manufactured by Mitsubishi Chemical Corporation), and NC-3000 (manufactured by Nippon Kayaku Co., Ltd.).

Examples of commercially available isocyanate-modified epoxy resin products include AER4152 (manufactured by Asahi Kasei Epoxy Co., Ltd.) and ACR1348 (manufactured by ADEKA Corporation), each of which has an oxazolidone ring.

The curing agent in the first resin composition is also referred to as a cross-linker compound. There are no specific limitations or restrictions on the choice of a compound as the curing agent, as long as it has at least one active group which reacts with the thermosetting resin. For the above epoxy resins, examples of suitable curing agents include, but are not limited to, polyamides, dicyandiamide [DICY], amidoamines (e.g., aromatic amidoamines such as aminobenzamides, aminobenzanilides, and aminobenzenesulfonamides), aromatic diamines (e.g., diaminodiphenylmethane, diaminodiphenylsulfone [DDS] such as Aradur® 9664-1 and Aradur® 9719-1 from Huntsman Advanced Materials), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines such as tetramethylguanidine, anhydrides (e.g., methylhexahydrophthalic anhydride), hydrazides (e.g., adipic acid dihydrazides [ADH], isophthalic dihydrazides [IDH], sebacic acid dihydrazides [SDH], valine dihydrazides [VDH], carbodihydrazides [CDH], icosanedioic acid dihydrazides, phthalic dihydrazide, terephthalic dihydrazide, 1,2,3-benzenetricarboxic trihydrazide, benzoic acid hydrazide, aliphatic monohydrazides, aliphatic trihydrazides, aliphatic tetrahydrazides, and aromatic monohydrazides, aromatic dihydrazides, aromatic trihydrazides, aromatic tetrahydrazides, p-toluenesulfonylhydrazide, benzenesulifinic hydrazide, benzenesulfonyl hydrazide, sulfuryl hydrazide, and phosphoric acid trihydrazide, 2-aminobenzoic hydrazide or 4-aminobenzoic hydrazide), hydrazines (e.g., phenylhydrazine, naphthalene hydrazine, 1-hexylhydrazine, p-phenylenebis(hydrazine), 1,6-hexamethylene dihydrazine, and 1,2-diphenyl hydrazine), phenol-novolac resins and cresol-novolac resins, carboxylic acid amides, polyphenol compounds, polysulfides and mercaptans, and Lewis acids and bases (e.g., boron trifluoride ethylamine, tris-(diethylaminomethyl) phenol).

Depending on the desired properties of the cured prepreg, a suitable curing agent or suitable combination of curing agents may be selected from the above list. For example, if dicyandiamide is used, it will generally provide the product with good elevated-temperature properties, good chemical resistance, and a good combination of tensile and peel strength. Aromatic diamines, on the other hand, will typically give high heat and chemical resistance and high modulus. Aminobenzoates will generally provide excellent tensile elongation though they often provide inferior heat resistance compared to aromatic diamines. Acid anhydrides generally provide the resin matrix with low viscosity and excellent workability, and, subsequently, high heat resistance after curing. Phenol-novolac resins and cresol-novolac resins provide moisture resistance due to the formation of ether bonds, which have excellent resistance to hydrolysis. Note that a mixture of two or more of the above curing agents could be employed. For example, by using DDS together with DICY as the hardener, the reinforcing fiber and the resin composition could adhere more firmly, and in particular, the heat resistance, the mechanical properties such as compressive strength, and the environmental resistance of the cured prepreg obtained may be markedly enhanced. In another example, when DDS is combined with an aromatic amidoamine (e.g., 3-aminobenzamide), an excellent balance of thermal and mechanical properties and environmental resistance could be achieved. In another example, when DDS is combined with a dihydrazide (e.g., isophthalic dihydrazide, adipic acid dihydrazide, or valine dihydrazide), curing is accelerated without penalizing thermal and mechanical properties.

A benzoxazine resin could be used as a curing agent for an epoxy resin. Examples of suitable benzoxazine resins include, but are not limited to, multi-functional n-phenyl benzoxazine resins such as phenolphthaleine based, thiodiphenyl based, bisphenol A based, bisphenol F based, and/or dicyclopentadiene based benzoxazines. When an epoxy resin or a mixture of epoxy resins with different functionalities is used with a benzoxazine resin or a mixture of benzoxazine resins of different kinds, the weight ratio of the epoxy resin(s) to the benzoxazine resin(s) could be between 0.01 and 100. The combination typically improves the processability of the benzoxazine resin and achieves exceptional resin modulus, heat resistance and hot-wet properties owing to the benzoxazine resin.

The curing agent may be employed in an amount up to about 75 parts by weight per 100 parts by weight of total thermosetting resin (75 phr). The curing agent might also be used in an amount different from a stoichiometric ratio between the thermosetting resin equivalent weight and the curing agent equivalent weight to obtain a desired resin modulus or glass transition temperature, and/or both. In such cases, an equivalent weight of the curing agent is varied by the number of reaction sites or active hydrogen atoms and is calculated by dividing its molecular weight by the number of active hydrogen atoms. For example, an amine equivalent weight of 2-aminobenzamide (molecular weight of 136) could be 68 for 2 functionality, 45.3 for 3 functionality, 34 for 4 functionality, and 27.2 for 5 functionality.

The accelerator in the first resin composition is used to create a complementary pair that speeds up reaction of the first resin composition. The accelerator when used with the curing agent in the first resin composition might result in more than one exotherm peak as defined below, wherein at least one of the peak exotherms occurs at a time earlier than and/or a temperature lower than that of any peak exotherm of the second resin composition. The accelerator, to some extent, might diffuse into the second resin composition comprising at least a thermosetting resin during prepreg manufacturing and/or cure (i.e., to set up a gradient concentration of the accelerator in the prepreg) and hence speed up its reactions at an elevated temperature while at the same time the prepreg maintains its excellent out time and tack at an ambient temperature), with an exotherm peak occurring at a later time than at least one of the exotherm peaks of the first resin composition. The accelerator might be used in an amount of at most 15 phr, at most 10 phr, at most 5 phr, or even at most 3 phr. Higher amounts can lead to faster cure rate but at the same time might reduce thermal and mechanical properties. Hence, an optimal amount of accelerator is often determined for each resin composition in the invention.

There are no specific limitations or restrictions on the choice of a compound or combination of compounds as the accelerator for each resin composition, as long as it can accelerate reactions between the thermosetting resin and the curing agent and does not deteriorate the effects of the invention. The accelerator might also be referred to as a co-curative agent in some contexts. Examples include, without limitation, urea compounds, sulfonate compounds, boron trifluoride piperidine, p-t-butylcatechol, sulfonate compounds, tertiary amines or salts thereof, imidazoles or salts thereof, phosphorus curing accelerators, metal carboxylates and Lewis or. Bronsted acids or salts thereof. Examples of suitable urea compounds include N,N-dimethyl-N'-(3,4-dichlorophenyl) urea, toluene bis(dimethylurea), 4,4'-methylene bis (phenyl dimethylurea), and 3-phenyl-1,1-dimethylurea. Commercial examples of such urea compounds include DCMU99 (manufactured by Hodogaya Chemical Co., Ltd.), and Omicure® 24, 52 and 94 (all manufactured by CVC Specialty Chemicals, Inc.). Commercial imidazole compound products or derivatives thereof include 2MZ, 2PZ and 2E4MZ (all manufactured by Shikoku Chemicals Corporation). Examples of suitable Lewis acid catalysts include complexes of a boron trihalide and a base, such as a boron trifluoride piperidine complex, boron trifluoride monoethyl amine complex, boron trifluoride triethanol amine complex, and boron trichloride octyl amine complex. Examples of sulfonate compounds include methyl p-toluenesulfonate, ethyl p-toluenesulfonate and isopropyl p-toluenesulfonate.

The curing agent and/or the accelerator for each resin composition may be encapsulated by a substance or substances that hinders their reactivity until a desired triggering temperature is reached during ramp up. The triggering temperature could be at least 80° C., at least 100° C., or even at least 120° C. The better latency of the curing agent/accelerator combination leads to an exceptional out time at ambient conditions or processing conditions.

There are no specific limitations or restrictions on the choice or choices of a thermosetting resin, a curing agent, and an accelerator in the first resin composition as long as the effects of the invention are not deteriorated. The first resin composition has at least one peak exotherm occurring at a time earlier than and/or at a temperature lower than at least one peak exotherm of the second resin composition and the total heat generated by the first resin composition during exotherm of the first resin composition is at least equal to that generated by the second resin composition during exotherm of the second resin composition. As a result, the earlier heat generation from the first resin composition could be used to either initiate or speed up the reaction of the second resin composition, reducing a dwell time at a cure temperature for the prepreg to achieve a desired degree of cure (DoC). In addition, since some heat from the first resin composition is released at an earlier time than heat from the second resin composition, the total heat generated from this prepreg when reaching a dwell could be substantially less than a prepreg that has both resin compositions generate heat at the same time. This would benefit thick composite articles that would normally produce uncontrollable large exotherms. Furthermore, a lower peak exotherm temperature of the total heat from the prepreg could result, allowing a higher set cure air temperature without the peak exotherm temperature approaching the maximum allowable temperature at which the cured composite might be degraded, i.e., a broader processing time-temperature window.

The peak exotherm time (or temperature) can be determined from a dynamic scanning calorimetry (DSC) thermogram of an uncured resin subjected to a dynamic scan with a heating rate of 10° C./min from −50° C. to a final temperature at which the exothermic reaction might be completed and above which thermal degradation might occur. For an epoxy based resin, the final temperature may be at most 400° C. or at most 350° C., or even at most 300° C. The peak exotherm time (or temperature) difference between two peak exotherms might be engineered appropriately through selections of components in the first resin composition and second resin composition to have the dwell time at the cure temperature as short as possible, or at most 5 min, at most 10 min, at most 15 min, at most 30 min, at most 60 min or even at most 90 min. The peak exotherm time difference could be at least 0.5 min, at least 1 min, at least 2 min or even at least 10 min. The peak exotherm temperature difference could be at least 5° C., at least 10° C., at least 20° C., or even at least 50° C. The total generated heat (i.e., the amount of heat generated) from either resin composition may be determined from the exotherm peak area(s) in the above-described thermogram. The generated heat difference between two resin compositions might be engineered appropriately through selections of components in the first resin composition and second resin composition to further reduce the dwell time of the prepreg at the cure temperature as much as possible. The total generated heat from the first resin composition could be, for example, at least 10%, at least 25%, or even at least 50% higher than the total generated heat from the second resin composition.

The percent cure or degree of cure (or DoC) of a prepreg could be determined using a differential scanning calorimeter (DSC) (Q200 with an RCS (mechanical refrigeration cooling system), manufactured by TA Instruments). The percent cure is determined by comparing the exothermic reaction peak's area of an uncured prepreg ($\Delta H_{UC}$) against the residual exothermic reaction peak's area of the prepreg when it is cured ($\Delta H_R$), using a ramp rate of 10° C./min. Herein, DoC is calculated as $[(\Delta H_{UC}-\Delta H_R)/\Delta H_{UC}\times100]$. Modulated DSC (MDSC) mode could be used instead. In this case, the condition might be 3° C./min heating rate, 60 second modulation and an amplitude of 1° C. For the DoC calculation, irreversible heats might be used. If MDSC is used, Tg could be obtained from the reversible heat data. In most resin systems, there is a correlation between Tg and DoC, i.e., knowing one could lead to knowing the other through the relationship. It is important to establish this relationship. Since Tg is independent of an amount of cured resin of a sample obtained from the cured composite article for DSC measurements while residual heat generation is not, obtaining Tg first then back calculating DoC using the established relationship when applicable is more preferred.

There are no specific limitations or restrictions on the choice of components in the surface layer comprising the second resin composition as described in examples below but not limited to those examples, as long as the effects of the invention are not deteriorated. The surface layer is applied as a barrier layer (on one or, preferably, both sides of the layer of impregnated reinforcing fibers) to hinder reactions of the first resin composition at ambient or processing conditions and therefore collectively extend the out time and drape of the prepreg that would result if the surface layer is not there. If a surface layer is present on both sides of the layer of impregnated reinforcing fibers, the two surface layers may be the same as or different from each other, provided that at least one of the surface layers (and preferably both of the surface layers) meets the criteria described herein.

In one embodiment, the second resin composition comprises a thermosetting resin and a curing agent. There are no specific limitations or restrictions on the choice of thermosetting resins and curing agents, as long as the effects of the invention are not deteriorated. Examples of thermosetting resins and curing agents were discussed above, in connection with the first resin composition.

In the above embodiment, the second resin composition may further comprise an interlayer toughening material (also referred to as an interlayer toughener). The interlayer toughening material may be localized on the surface(s) of the layer of reinforcing fibers (meaning that little or no interlayer toughening material is present within the layer of reinforcing fibers, upon curing of the prepreg) or localized in an interlayer region between two layers of reinforcing fibers of the prepreg (hereafter referred to as an interlayer). The interlayer toughening material is configured to provide significant impact resistance and tolerance to the cured prepreg versus the control composition without the interlayer toughening material. One of the key measurable properties is mode II fracture toughness (by shear mode) or $G_{IIC}$. For higher $G_{IIC}$, it is important to keep a crack propagating in the interlayer toughening layer. Another key property is compression-after-impact (CAI). In most cases, CAI relates to $G_{IIC}$ such that a higher $G_{IIC}$ leads to a higher CAI. In some cases, the interlayer toughener might be able to increase mode I fracture toughness (by opening mode).

The interlayer toughener may be one or more thermoplastics, one or more elastomers, or combinations of one or more elastomers and one or more thermoplastics, or combinations of an elastomer and an inorganic material such as glass, or pluralities of nanofibers or microfibers. The interlayer toughener may be in the form of a particulate or a sheet with a desired thickness (e.g., film, a mat, a woven or a non-woven fabric/veil). In some cases, the sheet form is preferred for ease of manufacturing the prepreg. If the interlayer toughener is in particulate form, the average particle size of the interlayer toughener may be no more than 100 µm, or even 5-50 µm, to keep the interlayer toughener particles in the interlayer after curing to provide maximum fracture toughness and CAI enhancements. Such particles are generally employed in amounts of up to about 30%, or up to about 15% by weight (based upon the weight of total resin content in the composite composition). The resulting interlayer thickness may be at most 200 µm, at most 100 µm or even at most 50 µm. The amount of the interlayer toughener and/or the thickness of the interlayer depends on the desired mechanical properties versus weight of the prepreg. For instance, a higher amount of the interlayer toughener may be needed to increase $G_{IIC}$ and CAI, but at the expense of compressive properties such as open-hole compression (OHC). Examples of suitable thermoplastic materials include polyamides. Known polyamide particles include SP-500, produced by Toray Industries, Inc., "Orgasol®" produced by Arkema, and Grilamid® TR-55 produced by EMS-Grivory, nylon-6, nylon-12, nylon 6/12, nylon 6/6, and Trogamid® CX by Evonik.

In one embodiment, the second resin composition comprises a thermosetting resin and a curing agent, and optionally an accelerator. There are no specific limitations or restrictions on the choice of thermosetting resins, curing agents, and accelerators, as long as the effects of the invention are not deteriorated. Examples of suitable thermosetting resins, curing agents, and accelerators were discussed above, in connection with the first resin composition.

In another embodiment, the second resin composition comprises at least a thermosetting resin and no curing agent. There are no specific limitations or restrictions on the choice of thermosetting resins in the surface layer comprising the second resin composition, as long as the effects of the invention are not deteriorated. Examples of thermosetting resins are discussed above. One or more thermosetting resins are suitable for the second resin composition as long as its viscosity and tackiness are appropriate to create the surface layer for the prepreg. The second resin composition may further comprise an interlayer toughening material as described above.

In another embodiment, the second resin composition comprises at least a combination of a thermoplastic resin, a thermosetting resin and no curing agent. There are no specific limitations or restrictions on the choice of thermoplastic and thermosetting resins in the surface layer comprising the second resin composition, as long as the effects of the invention are not deteriorated. In this case, the second resin composition may have viscosity and tackiness that are appropriate to create the surface layer for the prepreg. Examples of thermosetting resins are discussed above and examples of thermoplastic resins are discussed below. In addition, the thermoplastic resin might comprise the interlayer toughening material. When a thermosetting resin is present, an interlayer toughening material as described above may be included in the second resin composition as well.

In another embodiment, the second resin composition comprises at least a thermoplastic resin without a thermosetting resin and a curing agent. In this case, there is no exotherm or no reaction of the second resin composition (and hence no heat generated from the second resin composition). The surface layer comprising the second resin composition thus in this embodiment merely acts as a barrier to hinder the reactivity of the first resin composition at storage or process conditions. The reaction of the first resin composition is activated at an elevated temperature, allowing the prepreg to be cured at a cure temperature in a reduced dwell time for a given desired degree of cure. Examples of thermoplastic resins are discussed below. In addition, the thermoplastic resin might comprise the interlayer toughening material.

In another embodiment, the first resin composition comprises at least a thermosetting resin and a curing agent while the second resin composition comprises at least a thermosetting resin and an accelerator that is complementary to the curing agent in the first resin composition. During curing of the prepreg, the curing agent and the accelerator might diffuse into each resin composition and hence accelerate cure of both resin compositions, wherein the first resin composition has at least one peak exotherm occurring at a time earlier than and/or a temperature lower than that of any peak exotherm exhibited by the second resin composition.

The thermoplastic resin, if optionally used with a thermosetting resin, present in either first or second resin composition in the above embodiments, is typically selected to modify the viscosity of the resin composition for processing purposes, and/or enhance its toughness. The thermoplastic resin, when present, may be employed in any amount up to 50 phr, or even up to 35 phr for ease of processing. One could use, but is not limited to, the following thermoplastic resins: polyvinyl formals, polyamides, polycarbonates, polyacetals, polyphenyleneoxides, polyphenylene sulfides, polyarylates, polyesters, polyamideimides, polyimides, polyetherimides, polyimides having phenyltrimethylindane structure, polysulfones, polyethersulfones (e.g., Sumikaexcel® PES5003P from Sumitomo Chemical Co., Ltd., Virantage® VW-10700RP from Solvay), polyetherketones, polyetheretherketones, polyaramids, polyethernitriles, polybenzimidazoles, their derivatives and their mixtures thereof. One could use an aromatic thermoplastic resin which does not impair the high thermal resistance and high elastic modulus of the resin composition. The selected thermoplastic resin could be soluble in the thermosetting resin to a large extent to form a homogeneous mixture. The thermoplastic resins could be compounds (polymers) having aromatic skeletons which are selected from the group consisting of polysulfones, polyethersulfones, polyamides, polyamideimides, polyimides, polyetherimides, polyetherketones, and polyetheretherketones, their derivatives, the alike or similar polymers, and mixtures thereof. Polyethersulfones, polyimides, polyetherimides and mixtures thereof could be of interest due to their high heat resistance and toughness. Suitable polyethersulfones, for example, may have a number average molecular weight of from about 10,000 to about 75,000 g/mole. Note that the aforementioned thermoplastic resins could be used alone in one of the above resin compositions as long as the effects of the invention are not deteriorated.

Furthermore, all the resin compositions comprising a thermosetting resin as discussed above optionally may contain a filler comprising a conductive material and/or a non-conductive material to further improve mechanical properties such as toughness or strength or physical/thermal properties of the cured prepreg as long as the effects of the present invention are not deteriorated. If the filler is intended to toughen the thermosetting resin inside the layer of reinforcing fibers (hereafter referred to as an intralayer toughener), its longest dimension may be no more than 1 µm. A filtering effect in that particles may be concentrated outside a layer of reinforcing fibers could result if the longest dimension is greater than 1 µm. One or more polymeric and/or inorganic tougheners may be used. The intralayer toughener may be a conductive material or a non-conductive material. The intralayer toughener may be uniformly distributed in the form of particles in the cured prepreg to maximize its effects on the intended purpose(s). Such intralayer tougheners include, but are not limited to, elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "Nanostrength®" SBM (polystyrene-polybutadiene-polymethacrylate), and AMA (polymethacrylate-polybutylacrylate-polymethacrylate), both produced by Arkema. Other suitable block copolymers include Fortegra® and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) as an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and Kaneka Corporation's "KaneAce MX" product line of such particle/epoxy blends whose particles have a polymeric core polymerized from polymerizable monomers such as butadiene, styrene, other unsaturated carbon-carbon bond monomer(s), or their combinations, and a polymeric shell compatible with the epoxy, typically polymethylmethacrylate, polyglycidylmethacrylate, polyacrylonitrile or similar polymers. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which is a butyl acrylate methyl methacrylate copolymer. Examples of suitable oxide particles include Nanopox® produced by nanoresins AG. This is a master blend of functionalized nanosilica particles and an epoxy.

In one embodiment, the prepreg further comprises a breather layer comprising a high-aspect-ratio material, wherein the high-aspect ratio material is localized on the surface of the layer of reinforcing fibers and wherein the breather layer is configured to provide a network of air channels in the prepreg through which trapped air pockets and volatiles in the prepreg diffuse under vacuum during curing of the prepreg. The breather layer is configured to allow at least a portion of the high-aspect ratio material to infiltrate the layers of reinforcing fibers. The network of air channels may be formed from a high-aspect-ratio material that does not collapse or dissolve during curing of the prepreg and may have a hollow structure, a perforated structure, or a combination thereof. The surface of the high-aspect ratio material may be chemically modified with a functional group such that a resin composition partially wets or does not wet the high-aspect-ratio material during curing of the prepreg. The surface may also be coated with a compound that expands and volatilizes during curing of the prepreg. Such compounds are also referred to as blowing agents. The high-aspect-ratio material comprising a nanofiber or a plate-like nanomaterial may be a conductive material or a non-conductive material. In the context of the present invention, "high-aspect-ratio" means that the ratio of one dimension (i.e., width, length) to another dimension (thickness, diameter) is greater than 1 and "plate-like" means having the general shape of a plate having two large dimensions (length and width) and one small dimension (thickness). Examples of a plate-like material include but are not limited to clay, graphene, graphene oxide, graphene nanoplatelets or other materials having a thickness less than 10 nm, less than 100 nm or even less than 1000 nm. The nanofiber has an aspect ratio of length to diameter greater than one and a diameter of at most 1000 nm, at most 500 nm, or even at most 100 nm. Since the nanofiber is intended to be localized substantially on the surface of the layer of reinforcing fibers, one of its dimensions such as its length may be at least 0.5 µm, at least 1 µm, at least 3 µm or even at least 10 µm. Examples of nanofibers include carbon nanotubes (sometimes referred to as CNT), carbon nanofibers, oxide nanofibers (e.g. alumina, silica or glass), ceramic nanofibers, metal nanofibers (e.g., nickel strands), halloysite nanofibers, other suitable types of organic or inorganic nanofibers, or combinations thereof. The breather layer may have a thickness of at most 100%, at most 50%, or even at most 25% of the thickness of the interlayer toughening layer, and/or the loading of high-aspect-ratio material (e.g., nanofibers) in the barrier layer may be at most 100 wt %, at most 50 wt %, at most 25 wt % or even at most 10 wt % of the weight of the barrier layer as long as a percolation threshold is met, e.g., a network of interconnected nanofibers is formed. The thinner and/or the lighter the breather layer is, the more likely it is that the desired weight requirement of the prepreg will be achieved. The thicker the breather layer is, the greater the likelihood that a crack will be confined and propagate in the breather layer, which would be undesired for mechanical performance of the cured prepreg.

The breather layer may comprise a preformed assembly of the nanofibers and/or plate-like nanomaterial. The assembly of the nanofibers may have a substantial amount of the nanofibers aligned in a direction or in random orientations. The assembly may have a thickness of at least 10 nm, at least 100 nm, at least 1 µm or even at least 10 µm, and/or an area weight of at least 0.01 g/m$^2$, at least 0.1 g/m$^2$ or even at least 1 g/m$^2$. The assembly may be further impregnated by an adhesive composition having components similar to or different from those found in the first or the second resin composition. Such an impregnated nanofiber layer is called a nanofiber prepreg. Either the dry assembly of the nanofibers or the nanofiber prepreg may be placed on the surface of the dry reinforcing fibers or the surface of the layer of impregnated reinforcing fibers impregnated by the first resin composition.

In another embodiment, the above prepregs when isothermally cured at 177° C. (350° F.) for at most 60 minutes achieve a degree of cure of at least 93% and a glass transition temperature (Tg) of at least 175° C., or at least 185° C., or even at least 190° C. Higher Tg might allow a broader service temperature window below its Tg for a cured composite article. Preferably; Tg can be measured by a modulated differential scanning calorimetry (MDSC) by the method listed above, and optionally by a dynamic mechanical analysis (DMA) method with a heating rate of 10° C./min.

To some extent, the accelerator in the first resin composition might diffuse into the second resin composition, i.e., to establish a gradient concentration, during prepreg manufacturing and/or during cure. At ambient condition or other processing conditions the second resin composition acts a barrier layer to hinder heat transfer from the air through the second resin composition to the first resin composition, thus the accelerator in the first resin composition is kept inactivated. At elevated process condition such as curing, the accelerator at a sufficient temperature is activated and speeds up reactions between the thermosetting resin and the curing agent faster than the reactions between the thermosetting resin and the curing agent in the second resin composition, where applicable. Thus, heat generated from the first resin composition can be configured to initiate or speed up the reaction of the second resin composition, collectively allowing the prepreg to be isothermally cured at a temperature of 177° C. in at most 60 minutes to achieve a degree of cure of at least 93% or even at least 95%. Other cure profiles with a cure temperature higher or lower than 177° C. at an optimal dwell time shorter or longer than 60 minutes and a fast heating rate of at least 1.7° C./min to the cure temperature might be used to achieve a degree of cure of at least 90%, at least 93% or even at least 95% as long as the effects of the invention are not deteriorated. In one embodiment, for example, the prepreg can be isothermally cured at a temperature of 177° C. in at most 30 minutes to achieve a degree of cure of at least 90%, at least 93%, or even at least 95% to achieve a Tg of at least 175° C., 185° C. or even at least 190° C. Cured composite articles with a degree of cure lower than 93% might need to be post-cured to achieve at least 93% degree of cure to achieve stably high thermal and mechanical properties.

According to a second embodiment of the invention, a prepreg comprising a layer of impregnated reinforcing fibers comprising at least one layer of reinforcing fibers impregnated by a resin composition comprising at least an epoxy resin, a diaminodiphenylsulfone, a dihydrazide, and an interlayer toughener, wherein dihydrazide is tailored to have a gradient concentration which is more concentrated in the resin composition in the vicinity of the reinforcing fibers than further away, wherein the interlayer toughener is localized on the surface of the reinforcing fibers, and wherein the prepreg when cured at 177° C. (350° F.) for at most 60 minutes achieves a degree of cure of at least 93% and a glass transition temperature of at least 175° C.

In the above embodiment, there are no specific limitations or restrictions on the choice of an epoxy resin, a diaminodiphenylsulfone curing agent, and a dihydrazide accelerator/co-curative agent in the first resin composition as long as the effects of the invention are not deteriorated. The resin composition might comprise a first resin composition comprising the epoxy resin, the diaminodiphenylsulfone such as 4,4-diaminodiphenyl sulfone or 3,3-diaminodiphenolsulfone and the dihydrazide accelerator such as an adipic acid dihydrazide, an isophthalic dihydrazide, a sebacic acid dihydrazide, a valine dihydrazide, a carbodihydrazide, or an icosanedioic acid dihydrazide, as long as the effects of the invention are not deteriorated. The first resin composition may further comprise a thermoplastic resin and/or a filler. Examples of these components are discussed above. The second resin composition could be one of the aforementioned second resin compositions.

There are no specific limitations or restrictions on the choice of a method of making a prepreg comprising the first resin composition and the second resin composition as discussed above, as long as the effects of the present invention are not deteriorated.

One embodiment of the present invention relates to a manufacturing method for the prepreg comprising a hot melt method, where the first resin composition is heated to lower its viscosity and directly applied to the reinforcing fibers to obtain a resin-impregnated prepreg; or alternatively, as another method, the first resin composition is coated on a release paper to obtain a thin film. The film is consolidated onto both surfaces of a layer of reinforcing fibers by heat and pressure. The surface layer is then applied onto the surfaces of the impregnated reinforcing fiber layer via a hot melt method as previously mentioned or other suitable methods.

In other embodiments, the aforementioned prepregs may be cured in a molding method by a one-step cure to a final cure temperature, or by a multiple-step cure in which the prepreg is dwelled (maintained) at a certain dwell temperature for a certain period of dwell time to allow a good resin flow onto the reinforcing fibers' surfaces and removal of trapped air pockets and volatiles, and ramped up and cured at the final cure temperature for a desired period of time. The ramp rate may be at least 0.5° C./min, at least 5° C./min, at least 20° C./min or even at least 50° C./min. The final cure temperature may be about 220° C. or less, or about 190° C. or less. The prepregs may be kept at the final cure temperature until a degree of cure reaches at least 80%. Vacuum and/or external pressure may be applied to the prepreg during cure. Examples of molding methods include, but are not limited to, autoclave, vacuum bag only, Quickstep, pressure-press (i.e., one side of the article to be cured contacts a heated tool's surface while the other side is under pressurized air with or without a heat medium), compression molding or a similar method. Note that other curing methods using an energy source other than thermal, such as a conduction method, microwave oven, or plasma-assisted microwave oven, or a combination of such methods may be applied.

To produce a composite article from the prepreg, for example, one or more plies are applied onto a tool surface or mandrel. This process is often referred to as tape-wrapping. Heat and pressure are needed to laminate the plies as described above. The tool is collapsible or removed after curing.

EXAMPLES

Next, certain embodiments of the invention are illustrated in detail by means of the following examples using the following components:

| Component | Product name | Manufacturer | Description |
|---|---|---|---|
| Epoxy | ELM434 | Sumitomo Chemical Co., Ltd. | Tetra glycidyl diamino diphenyl methane with a functionality of 4, having an average EEW of 120 (ELM434) |
| | Epon® 825 | Momentive Specialty Chemicals | Diglycidyl ether of bisphenol A with a functionality of 2, having an average EEW of 177 (EP825) |
| | Epon® 828 | Momentive Specialty Chemicals | Difunctional bisphenol A/epichlorohydrin, having an average EEW of 188 (EP828) |
| | Epiclon® 830 | DIC Corporation | Diglycidyl ether of bisphenol F with a functionality of 2, having an average EEW of 177 (EPc830) |
| | Araldite® MY0610 | Huntsman Advanced Materials | Triglycidyl meta-aminophenol with a functionality of 3, having an average EEW of 100 (MY610) |
| | GAN | Nippon Kayaku K.K. | Glycidylaniline with a functionality of 2 and having an average EEW of 166 (GAN) |
| | Epon® 2005 | Momentive Specialty Chemicals | Diglycidyl ether of bisphenol A with a functionality of 2, having an average EEW of 1300 (EP2005) |
| | Epon® 1001 | Momentive Specialty Chemicals | Diglycidyl ether of bisphenol A with a functionality of 2, having an average EEW of 537 (EP1001) |
| Thermoplastic resin | Sumikaexcel® PES5003P | Sumitomo Chemical Co., Ltd. | Polyethersulfone, MW 38,200 (PES1) |
| | Virantage®VW-10700RP | Solvay | Polyethersulfone, MW 21,000 (PES2) |
| | Ultem® 1000P | Sabic | Polyetherimide (PEI) |
| Interlayer toughener | Grilamid® TR55 | EMS-Grivory | Polyamide (PA) |
| Curing agent | Aradur® 9664-1 | Huntsman Advanced Materials | 4,4'-diaminodiphenyl sulfone (4,4-DDS) |
| | Aradur® 9719-1 | Huntsman Advanced Materials | 3,3-diaminodiphenyl sulfone (3,3-DDS) |
| Accelerator | Ethyl p-toluenesulfonate | Sigma Aldrich | Ethyl p-toluenesulfonate (EPTS) |
| | Adipic acid dihydrazide | A&C Catalysts | Adipic acid dihydrazide (ADH) |
| | Isophthalic dihydrazide | A&C Catalysts | Isophthalic dihydrazide (IDH) |
| | Valine dihydrazide | A&C Catalysts | Valine dihydrazide (VDH) |
| | Dyhard® UR200 | Alz Chem Trostberq GmbH | 3-(3,4-dichlorophenyl)-1,1-dimethyl urea (UR200) |
| Fiber | Torayca® T800SC-24K-10E | Toray Industries, Inc. | 24,000 fibers, tensile strength 5.9 GPa, tensile modulus 290 GPa, tensile strain 2.0%, type-1 sizing for epoxy resin systems (T800S-10) |

Comparative Examples 1-2 and Examples 1-2

For these examples, 4,4-diaminodiphenylsulfone curing agent (4,4-DDS) and ethyl p-toluenesulfonate (EPTS) accelerator were used. Comparative Example 1 comprises no EPTS in either the first resin composition or the second resin composition, Comparative Example 2 comprises 2 phr EPTS in both resin compositions, while Examples 1 and 2 comprise 2 phr and 3 phr EPTS in the first resin composition, respectively.

Appropriate amounts of each component of a resin composition as shown in Table 1, except the curing agent, were charged into a mixer preheated at 100° C. After charging, the temperature was increased to 160° C. while the mixture was agitated, and held for 1 hr. After that, the mixture was cooled to under 100° C. and the curing agent was charged and mixed. The accelerator as needed was charged and agitated for 30 min. The final resin mixture was discharged and a portion was stored in a freezer for later use.

To make a prepreg, for example in Comparative Example 1, the hot first resin composition (1 in Table 1) and the hot second resin composition (A in Table 1) were first cast into a thin film using a knife coater onto a release paper to obtain film #1 and film #2. The film #1 was consolidated onto a bed of fibers on both sides by heat and compaction pressure, followed by the film #2. A unidirectional (UD) prepreg having a carbon fiber area weight of about 190 g/m$^2$ and resin content of about 35% by weight was obtained.

The prepregs were placed on a surface at ambient condition (70° F., 50% RH) for conditioning. Out time was documented by measuring the change in Tg (ΔTg) by DSC at a day of interest vs. day 0. As shown in Table 2 for Comparative Example 1, ΔTg increased over time due to slow reactions between epoxies and 4,4-DDS. When EPTS was added to both resins as in Comparison Example 2, a higher increase in ΔTg from about 2° C. after 5 days and about 9° C. after 45 days was observed. The increase was due to faster reactions. Surprisingly, when EPTS was added only to the first resin composition as in Examples 1-2, ΔTg was also increased versus the control (Comparative Example 1), but about 1-5° C. less than those observed from Comparative Example 2. The higher ΔTg in these examples may lead to lower tack, but it was not examined in this study.

The prepregs were cut and hand laid up with the sequence listed in Table 2 for each type of mechanical test, following an ASTM procedure as shown in Table 3. Panels were cured in an autoclave at 177° C. for 120, 60 or 30 min according to Table 2 with a ramp rate of 1.7° C./min and a pressure of 0.59 MPa.

Typically, to achieve the highest stable thermal and mechanical properties for aerospace applications, 120 min cure at 177° C. as shown in Comparative Example 1 is needed to achieve a DoC of 93% and a Tg of 206° C. Such high DoC and Tg are required to reduce property knockdown when the composite coupon is conditioned and tested at a hot-wet condition than ambient condition, for example conditioned at 70° C. and 85% RH for two weeks, then tested at 72° C. When the dwell time at 177° C. was reduced from 120 min to 60 min, both DoC and Tg were reduced to 86% (vs. 93%) and 193° C. (vs. 206° C.), respectively, as shown in Comparative Example 1. Yet, when EPTS was introduced, when cured at 177° C. for 60 min, a DoC of at least 95% and a Tg of at least 200° C. were obtained, and when cured at 177° C. for 30 min, a DoC of at least 90% and a Tg of at least 200° C. were obtained. Consequently, similar mechanical performance to the control resulted.

Since a lower ΔTg is more preferred to improve handleability and a shorter dwell time leading to a shorter cure cycle time is more preferred for higher production rate of a composite article, prepreg systems such as those illustrated in Examples 1-2 are more attractive and beneficial to part makers.

Comparative Examples 1, 3 and Examples 3-4

For these examples, 4,4-DDS curing agent and either VDH or IDH accelerator/co-curative were used. Comparative Example 1 comprised no accelerator/co-curative in either the first resin composition or the second resin composition, Comparative Example 3 comprised IDH in both resin compositions, while Examples 3 and 4 comprise either VDH or IDH, in the first resin composition, respectively.

The prepregs were made in a similar fashion as the above examples. Both out time and performance studies as described above were carried out. Surprisingly, ΔTg increased slightly about 1-2° C. from the control (Comparative Example 1) for all systems with added VDH or IDH versus EPTS. In addition, when either VDH or IDH was added to the first resin composition only, as shown in Examples 3 and 4, respectively, ΔTg increased about 1° C. from the control. The added benefits for these systems were that they could be cured at 177° C. for 30 min and achieve a DoC of at least 95% and a Tg of at least 200° C., leading to similar mechanical performance as the control when cured at the same temperature for 120 min.

Comparative Examples 1 and Examples 5-6

For these examples, 4,4-DDS curing agent and either VDH or EPTS accelerator/co-curative were used. Comparative Example 1 comprises no accelerator/co-curative in either the first resin or the second resin, while Example 5 reflects an embodiment in which the first resin composition comprises 4,4-DDS/VDH and the second resin composition comprises no curative material; and Example 6 reflects another embodiment in which the first resin composition comprises 4,4-DDS and the second resin comprises EPTS. These examples demonstrate that if there is inter-diffusion of the curing agent and/or the accelerator from one resin composition towards another resin during cure, a speeding up of the reactions is observed in addition to improved out time. This is because the second resin composition lacks an appropriate curative material; the reaction will therefore be very slow at ambient conditions.

The prepregs were made in a similar fashion as the above examples. Both out time and performance studies were carried out as described above. Surprisingly, ΔTg reduced slightly (about 1° C.) from the control (Comparative Example 1) for all systems with added VDH or EPTS. The added benefits again for these systems were that they could be cured at 177° C. for 60 min and achieved a DoC of at least 93% and a Tg of at least 200° C., leading to similar mechanical performance as the control when cured at the same temperature for 120 min.

Comparative Examples 4, 5 and Examples 7-10

For these examples, 3,3-diaminodiphenylsulfone curing agent (3,3-DDS) and either EPTS or IDH accelerator/co-curative in Example 7-8 were used to observe the out time and performance of 3,3-DDS vs. 4,4-DDS. Comparative Example 4 comprises no accelerator/co-curative in either the first resin composition or the second resin composition, Comparative Example 5 comprises EPTS in both resin compositions, while Examples 7 and 8 comprise either EPTS or IDH in the first resin composition, respectively. In addition, additional accelerator/co-curatives such as ADH and UR200 were examined in Example 9 and Example 10, respectively.

The prepregs were made in a similar fashion as the above examples. Both out time and performance studies were carried out as described above. When switching to 3,3-DDS and cured at 177° C. for 30 min, the resin composition in Comparative Example 4 achieved a DoC of about 89% and a Tg of about 183° C. vs. about 84% DoC and about 189° C. in Comparative Example 1 with 4,4-DDS. This reflects a more reactive 3,3-DDS but a lower thermal resistance than 4,4-DDS. However, with the added accelerator a DoC of greater than 90% and a Tg of greater than 190° C. were achieved.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. The numerical ranges disclosed inherently support any range within the disclosed numerical ranges though a precise range limitation is not stated verbatim in the specification because this invention can be practiced throughout the disclosed numerical ranges. Finally, the entire disclosures of the patents and publications referred in this application are hereby incorporated herein by reference.

TABLE 1

|  |  |  | CE1 | | CE2 | | Ex1 | | Ex2 | | CE3 | | Ex3 | | Ex4 | | Ex5 | |
|---|---|---|---|---|---|---|---|---|---|---|---|---|---|---|---|---|---|---|
|  |  |  | 1 | A | 2 | B | 2 | A | 3 | A | 4 | C | 5 | A | 4 | A | 6 | D |
| Resin matrix composition (phr) | Epoxy | ELM434 | 55 | 55 | 55 | 55 | 55 | 55 | 55 | 55 | 55 | 55 | 55 | 55 | 55 | 55 | 55 | 55 |
|  |  | EP825 | 25 | 0 | 25 | 0 | 25 | 0 | 25 | 0 | 25 | 0 | 25 | 0 | 25 | 0 | 25 | 0 |
|  |  | EP828 | 0 | 25 | 0 | 25 | 0 | 25 | 0 | 25 | 0 | 25 | 0 | 25 | 0 | 25 | 0 | 0 |
|  |  | EPc830 | 20 | 20 | 20 | 20 | 20 | 20 | 20 | 20 | 20 | 20 | 20 | 20 | 20 | 20 | 20 | 20 |
|  |  | EP2005 | 0 | 0 | 0 | 0 | 0 | 0 | 0 | 0 | 0 | 0 | 0 | 0 | 0 | 0 | 0 | 0 |
|  |  | EP1001 | 0 | 0 | 0 | 0 | 0 | 0 | 0 | 0 | 0 | 0 | 0 | 0 | 0 | 0 | 0 | 25 |
|  |  | GAN | 0 | 0 | 0 | 0 | 0 | 0 | 0 | 0 | 0 | 0 | 0 | 0 | 0 | 0 | 0 | 0 |
|  |  | MY0610 | 0 | 0 | 0 | 0 | 0 | 0 | 0 | 0 | 0 | 0 | 0 | 0 | 0 | 0 | 0 | 0 |
|  | Curative | 4-4-DDS | 44 | 44 | 44 | 44 | 44 | 44 | 44 | 44 | 44 | 44 | 44 | 44 | 44 | 44 | 70 | 0 |
|  |  | 3,3-DDS | 0 | 0 | 0 | 0 | 0 | 0 | 0 | 0 | 0 | 0 | 0 | 0 | 0 | 0 | 0 | 0 |
|  | Accelerator/ Co-curative | IDH | 0 | 0 | 0 | 0 | 0 | 0 | 0 | 0 | 8 | 8 | 0 | 0 | 8 | 0 | 0 | 0 |
|  |  | VDH | 0 | 0 | 0 | 0 | 0 | 0 | 0 | 0 | 0 | 0 | 5 | 0 | 0 | 0 | 8 | 0 |
|  |  | ADH | 0 | 0 | 0 | 0 | 0 | 0 | 0 | 0 | 0 | 0 | 0 | 0 | 0 | 0 | 0 | 0 |
|  |  | UR200 | 0 | 0 | 0 | 0 | 0 | 0 | 0 | 0 | 0 | 0 | 0 | 0 | 0 | 0 | 0 | 0 |
|  |  | EPTS | 0 | 0 | 2 | 2 | 2 | 0 | 3 | 0 | 0 | 0 | 0 | 0 | 0 | 0 | 0 | 0 |
|  | Thermoplastic resin | PES1 | 8 | 16 | 8 | 16 | 8 | 16 | 8 | 16 | 8 | 16 | 8 | 16 | 8 | 16 | 8 | 16 |
|  |  | PES2 | 0 | 0 | 0 | 0 | 0 | 0 | 0 | 0 | 0 | 0 | 0 | 0 | 0 | 0 | 0 | 0 |
|  |  | PEI | 0 | 0 | 0 | 0 | 0 | 0 | 0 | 0 | 0 | 0 | 0 | 0 | 0 | 0 | 0 | 0 |
|  | Interlayer toughening material | PA | 0 | 60 | 0 | 60 | 0 | 60 | 0 | 60 | 0 | 60 | 0 | 60 | 0 | 60 | 0 | 60 |
| Out time @ ambient ΔTg (° C.) | | 0 day | 0.0 | | 0.0 | | 0.0 | | 0.0 | | 0.0 | | 0.0 | | 0.0 | | 0.0 | |
|  |  | 5 day | -0.3 | | 2.3 | | 1.0 | | 0.9 | | -0.2 | | -0.2 | | -0.6 | | 0.1 | |
|  |  | 12 day | 2.7 | | 8.2 | | 5.9 | | 7.5 | | 4.2 | | 3.4 | | 3.6 | | 2.3 | |
|  |  | 19 day | 4.5 | | 11.7 | | 8.5 | | 10.5 | | 6.3 | | 5.2 | | 5.5 | | 4.2 | |
|  |  | 26 day | 6.3 | | 15.5 | | 10.5 | | 14.3 | | 8.0 | | 7.0 | | 7.2 | | 5.5 | |
|  |  | 33 day | 8.7 | | 18.5 | | 12.2 | | 17.1 | | 9.3 | | 8.9 | | 9.3 | | 7.9 | |
|  |  | 45 day | 12.0 | | 21.0 | | 16.2 | | 20.0 | | 13.9 | | 12.1 | | 12.8 | | 11.6 | |

|  |  |  | Ex6 | | CE4 | | CE5 | | Ex7 | | Ex8 | | Ex9 | | Ex10 | |
|---|---|---|---|---|---|---|---|---|---|---|---|---|---|---|---|---|
|  |  |  | 7 | E | 8 | F | 9 | G | 9 | F | 10 | F | 11 | H | 12 | H |
| Resin matrix composition (phr) | Epoxy | ELM434 | 55 | 55 | 45 | 45 | 45 | 45 | 45 | 45 | 45 | 45 | 45 | 45 | 45 | 45 |
|  |  | EP825 | 25 | 0 | 10 | 10 | 10 | 10 | 10 | 10 | 10 | 10 | 10 | 10 | 10 | 10 |
|  |  | EP828 | 0 | 0 | 0 | 0 | 0 | 0 | 0 | 0 | 0 | 0 | 0 | 0 | 0 | 0 |
|  |  | EPc830 | 20 | 20 | 0 | 0 | 0 | 0 | 0 | 0 | 0 | 0 | 0 | 0 | 0 | 0 |
|  |  | EP2005 | 0 | 25 | 0 | 0 | 0 | 0 | 0 | 0 | 0 | 0 | 0 | 0 | 0 | 0 |
|  |  | EP1001 | 0 | 0 | 0 | 0 | 0 | 0 | 0 | 0 | 0 | 0 | 0 | 0 | 0 | 0 |
|  |  | GAN | 0 | 0 | 30 | 30 | 30 | 30 | 30 | 30 | 30 | 30 | 30 | 30 | 30 | 30 |
|  |  | MY0610 | 0 | 0 | 15 | 15 | 15 | 15 | 15 | 15 | 15 | 15 | 15 | 15 | 15 | 15 |
|  | Curative | 4-4-DDS | 70 | 0 | 0 | 0 | 0 | 0 | 0 | 0 | 0 | 0 | 0 | 0 | 0 | 0 |
|  |  | 3,3-DDS | 0 | 0 | 47 | 47 | 47 | 47 | 47 | 47 | 47 | 47 | 47 | 47 | 47 | 47 |
|  | Accelerator/ Co-curative | IDH | 0 | 0 | 0 | 0 | 0 | 0 | 0 | 0 | 8 | 0 | 0 | 0 | 0 | 0 |
|  |  | VDH | 0 | 0 | 0 | 0 | 0 | 0 | 0 | 0 | 0 | 0 | 0 | 0 | 0 | 0 |
|  |  | ADH | 0 | 0 | 0 | 0 | 0 | 0 | 0 | 0 | 0 | 5 | 0 | 0 | 0 | 0 |
|  |  | UR200 | 0 | 0 | 0 | 0 | 0 | 0 | 0 | 0 | 0 | 0 | 5 | 0 | 0 | 0 |
|  |  | EPTS | 0 | 3 | 0 | 0 | 2 | 2 | 2 | 0 | 0 | 0 | 0 | 0 | 0 | 0 |
|  | Thermoplastic resin | PES1 | 8 | 16 | 0 | 0 | 0 | 0 | 0 | 0 | 0 | 0 | 0 | 0 | 0 | 0 |
|  |  | PES2 | 0 | 0 | 14 | 18 | 14 | 18 | 14 | 18 | 14 | 18 | 0 | 0 | 0 | 0 |
|  |  | PEI | 0 | 0 | 0 | 0 | 0 | 0 | 0 | 0 | 0 | 0 | 6 | 12 | 6 | 12 |
|  | Interlayer toughening material | PA | 0 | 60 | 0 | 60 | 0 | 60 | 0 | 60 | 0 | 60 | 0 | 60 | 0 | 60 |
| Out time @ ambient ΔTg (° C.) | | 0 day | 0.0 | | 0.0 | | 0.0 | | 0.0 | | 0.0 | | 0.0 | | 0.0 | |
|  |  | 5 day | 0.2 | | -0.3 | | -0.1 | | 0.1 | | 0.2 | | 0.1 | | 0.2 | |
|  |  | 12 day | 1.8 | | 3.6 | | 4.4 | | 3.6 | | 3.7 | | 3.8 | | 4.0 | |
|  |  | 19 day | 3.5 | | 4.9 | | 7.3 | | 6.1 | | 5.3 | | 5.2 | | 5.3 | |
|  |  | 26 day | 5.0 | | 7.9 | | 10.4 | | 9.0 | | 8.5 | | 8.3 | | 8.5 | |
|  |  | 33 day | 7.2 | | 9.2 | | 14.2 | | 12.5 | | 10.0 | | 9.8 | | 10.0 | |
|  |  | 45 day | 10.8 | | 14.5 | | 17.0 | | 16.0 | | 15.0 | | 15.0 | | 15.2 | |

TABLE 2

|  |  | Material | | | | | | | | | |
|---|---|---|---|---|---|---|---|---|---|---|---|
|  |  | CE1 | CE1 | CE2 | Ex1 | Ex2 | CE1 | Ex1 | Ex2 | CE3 | Ex3 |
| Cure condition | Cure temp (° C.) | 350 | 350 | 350 | 350 | 350 | 350 | 350 | 350 | 350 | 350 |
|  | Curing time (min) | 120 | 60 | 60 | 60 | 60 | 30 | 30 | 30 | 30 | 30 |
| CFRP | Degree of cure (%) | 93 | 86 | 98 | 98 | 99 | 84 | 91 | 92 | 98 | 95 |
|  | Tg (° C.) | 206 | 193 | 203 | 201 | 203 | 189 | 207 | 206 | 210 | 203 |
|  | DCB (lb.in/in2) | 3.0 | 2.8 | 4.4 | 4.3 | 4.7 | 2.8 | 4.1 | 4.0 | 3.5 | 4.5 |

TABLE 2-continued

|  | ENF (lb.in/in2) | 12.5 | 13.2 | 7.4 | 11.5 | 8.2 | 13.0 | 10.1 | 11.2 | 11.0 | 11.6 |
|  | ILSS (ksi) | 15.2 | 14.9 | 14.8 | 14.9 | 14.9 | 15.1 | 14.5 | 14.6 | 14.5 | 15.0 |
|  | 0 Flex (ksi)* | 168 | 176 | 172 | 181 | 180 | 170 | 182 | 183 | 182 | 169 |
|  | 0 Flex Mod (Mpsi)* | 19.1 | 19.3 | 19.0 | 19.6 | 19.4 | 17.5 | 19.7 | 20.3 | 18.6 | 18.5 |
|  | 0 TS (ksi)* | 428 | 448 | 456 | 464 | 472 | 443 | 422 | 478 | 451 | 455 |
|  | 0 TM (Mpsi) | 22.7 | 22.6 | 22.6 | 22.7 | 22.7 | 22.4 | 22.6 | 22.5 | 22.9 | 22.8 |
|  | 0 TS strain (%)* | 1.7 | 1.7 | 1.8 | 1.8 | 1.9 | 1.8 | 1.8 | 1.9 | 1.8 | 1.9 |
|  | 0 CS (ksi)* | 203 | 210 | 220 | 219 | 211 | 225 | 227 | 230 | 235 | 230 |

| | | Material | | | | | | | | | |
|---|---|---|---|---|---|---|---|---|---|---|---|
| | | Ex4 | Ex5 | Ex6 | CE4 | CE4 | CE5 | Ex7 | Ex8 | Ex9 | Ex10 |
| Cure condition | Cure temp (° C.) | 350 | 350 | 350 | 350 | 350 | 350 | 350 | 350 | 350 | 350 |
| | Curing time (min) | 30 | 60 | 60 | 60 | 30 | 30 | 30 | 30 | 30 | 30 |
| CFRP | Degree of cure (%) | 97 | 94 | 94 | 92 | 89 | 99 | 99 | 98 | 97 | 97 |
| | Tg (° C.) | 205 | 202 | 200 | 188 | 183 | 191 | 193 | 194 | 195 | 192 |
| | DCB (lb.in/in2) | 4.1 | 3.2 | 3.5 | 4.3 | 4.0 | 4.3 | 4.8 | 3.5 | 4.8 | 3.9 |
| | ENF (lb.in/in2) | 10.5 | 11.3 | 11.5 | 12.8 | 12.0 | 9.0 | 11.4 | 10.7 | 11.4 | 11.2 |
| | ILSS (ksi) | 14.8 | 13.9 | 14.2 | 15.1 | 14.5 | 14.6 | 14.8 | 13.9 | 14.8 | 14.7 |
| | 0 Flex (ksi)* | 177 | 170 | 173 | 194 | 189 | 181 | 178 | 167 | 178 | 178 |
| | 0 Flex Mod (Mpsi)* | 18.4 | 18.6 | 18.2 | 20.2 | 20.0 | 19.5 | 19.0 | 19.2 | 19.0 | 19.0 |
| | 0 TS (ksi)* | 466 | 465 | 454 | 491 | 486 | 484 | 483 | 476 | 483 | 464 |
| | 0 TM (Mpsi) | 23.1 | 22.9 | 22.8 | 23.3 | 23.0 | 23.1 | 23.2 | 23.0 | 23.2 | 22.9 |
| | 0 TS strain (%)* | 1.8 | 1.9 | 1.8 | 1.9 | 1.9 | 1.9 | 1.9 | 1.8 | 1.9 | 1.8 |
| | 0 CS (ksi)* | 241 | 230 | 228 | 251 | 245 | 249 | 251 | 245 | 251 | 234 |

*Normalized to Vf of 60%

TABLE 3

| Test Panel | Test method | Panel Size (mm × mm) | Ply Lay-up Configuration | Test Condition |
|---|---|---|---|---|
| 0° Tensile | ASTM D 3039 | 300 × 300 | $(0)_6$ | RTD |
| Compression strength | ASTM D 695/ ASTM D 3410 | 300 × 300 | $(0)_6$ | RTD |
| ILSS | ASTM D-2344 | 300 × 300 | $(0)_{12}$ | RTD |
| DCB (for $G_{IC}$) | ASTM D 5528 | 350 × 300 | $(0)_{20}$ | RTD |
| 0° Flexure | ASTM D 790 | 300 × 300 | $(0)_{12}$ | RTD |
| ENF (for $G_{IIC}$) | JIS K 7086* | 350 × 300 | $(0)_{20}$ | RTD |

What is claimed is:

1. A prepreg comprising a layer of impregnated reinforcing carbon fibers comprising at least one layer of reinforcing carbon fibers impregnated by a resin composition comprising at least a thermosetting resin, a curing agent and an accelerator, such that the accelerator has a gradient concentration which is more concentrated in the resin composition in the vicinity of the reinforcing carbon fibers than further away, wherein the resin composition comprises a first resin composition impregnating the reinforcing carbon fibers and a surface layer comprising a second resin composition formed on the layer of impregnated reinforcing carbon fibers, wherein the first resin composition has at least one peak exotherm occurring at a time earlier than and/or at a temperature lower than any peak exotherm of the second resin composition and the first resin composition generates an amount of heat during exotherm that is at least equal to the amount of heat generated by the second resin composition during exotherm, such that the generated heat from the first resin composition is configured to initiate or speed up reaction of the second resin composition, allowing the prepreg to be cured at a cure temperature in a reduced dwell time for a given desired degree of cure.

2. The prepreg of claim 1, wherein the first resin composition comprises the thermosetting resin, the curing agent and the accelerator.

3. The prepreg of claim 2, wherein the first resin composition further comprises a thermoplastic resin, a filler or a combination thereof.

4. The prepreg of claim 2, wherein the second resin composition comprises at least a thermosetting resin and a curing agent and wherein the thermosetting resin of the second resin composition is the same as or different from the thermosetting resin of the first resin composition and the curing agent of the second resin composition is the same as or different from the curing agent of the first resin composition.

5. The prepreg of claim 4 further comprising an interlayer toughener, wherein the interlayer toughener is localized on a surface of impregnated reinforcing fibers to which the surface layer is applied.

6. The prepreg of claim 5, wherein the second resin composition further comprises a thermoplastic resin, a filler, or a combination thereof.

7. The prepreg of claim 5, wherein the second resin composition further comprises an accelerator that is the same as or different from the accelerator present in the first resin composition.

8. The prepreg of claim 5, further comprising a breather layer comprising a high-aspect-ratio material, wherein the high-aspect ratio material is localized on the surface of the layer of reinforcing fibers and wherein the breather layer is configured to provide a network of air channels in the prepreg through which trapped air pockets and volatiles in the prepreg diffuse under vacuum during curing of the prepreg.

9. The prepreg of claim 8, wherein the breather layer is configured to allow at least a portion of the high-aspect ratio material to infiltrate the layer of reinforcing fibers.

10. A manufacturing method for the prepreg of claim 5 comprising (1) impregnating the first resin composition onto one side or both sides of a plurality of reinforcing fibers to form an impregnated plurality of reinforcing fibers, (2) applying the second resin composition onto one side or both sides of the impregnated plurality of reinforcing fibers.

11. A method of manufacturing a composite article comprising curing the prepreg of claim 5.

12. The prepreg of claim 2, wherein the second resin composition comprises at least a thermoplastic resin or at least a thermosetting resin and no curing agent, or a combination.

13. A manufacturing method for the prepreg of claim 12 comprising (1) impregnating the first resin composition onto one side or both sides of a plurality of reinforcing fibers to form an impregnated plurality of reinforcing fibers, (2) applying the second resin composition onto one side or both sides of the impregnated plurality of reinforcing fibers.

14. A method of manufacturing a composite article comprising curing the prepreg of claim 12.

15. The prepreg of claim 1, wherein the first resin composition comprises the thermosetting resin and the curing agent and no accelerator, and the second resin composition comprises at least a thermosetting resin, the accelerator and no curing agent, wherein the thermosetting resin of the second resin composition is the same as or different from the thermosetting resin of the first resin composition, wherein the accelerator, the curing agent, or both diffuse into the other resin composition when the prepreg is heated and accelerate curing of the prepreg.

16. A manufacturing method for the prepreg of claim 15 comprising (1) impregnating the first resin composition onto one side or both sides of a plurality of reinforcing fibers to form an impregnated plurality of reinforcing fibers, (2) applying the second resin composition onto one side or both sides of the impregnated plurality of reinforcing fibers.

17. A method of manufacturing a composite article comprising curing the prepreg of claim 15.

18. The prepreg of claim 1, wherein the prepreg when isothermally cured at 177° C. (350° F.) for at most 60 minutes achieves a degree of cure of at least 93% and a glass transition temperature of at least 175° C.

19. The prepreg of claim 18, wherein the prepreg when isothermally cured at 177° C. (350° F.) for at most 60 minutes achieves a degree of cure is at least 93% and the glass transition temperature is at least 190° C.

20. The prepreg of claim 19, wherein the prepreg when isothermally cured at 177° C. (350° F.) for at most 30 minutes achieves a degree of cure of at least 90% and the glass transition temperature is at least 190° C.

21. A manufacturing method for the prepreg of claim 1 comprising (1) impregnating a first resin composition onto one side or both sides of a plurality of reinforcing fibers to form an impregnated plurality of reinforcing fibers, (2) applying a second resin composition onto one side or both sides of the impregnated plurality of reinforcing fibers, wherein the first resin composition comprises at least a thermosetting resin, a curing agent and an accelerator and the second resin composition comprises at least a thermosetting resin and a curing agent, wherein the thermosetting resin present in the second resin composition is the same as or different from the thermosetting resin present in the first resin composition and the curing agent present in the second resin composition is the same as or different from the curing agent present in the first resin composition.

22. A method of manufacturing a composite article comprising curing the prepreg of claim 1.

* * * * *